J. S. LANG.
EGG CASE.
APPLICATION FILED AUG. 10, 1914.
1,205,362.
Patented Nov. 21, 1916.
2 SHEETS—SHEET 1.
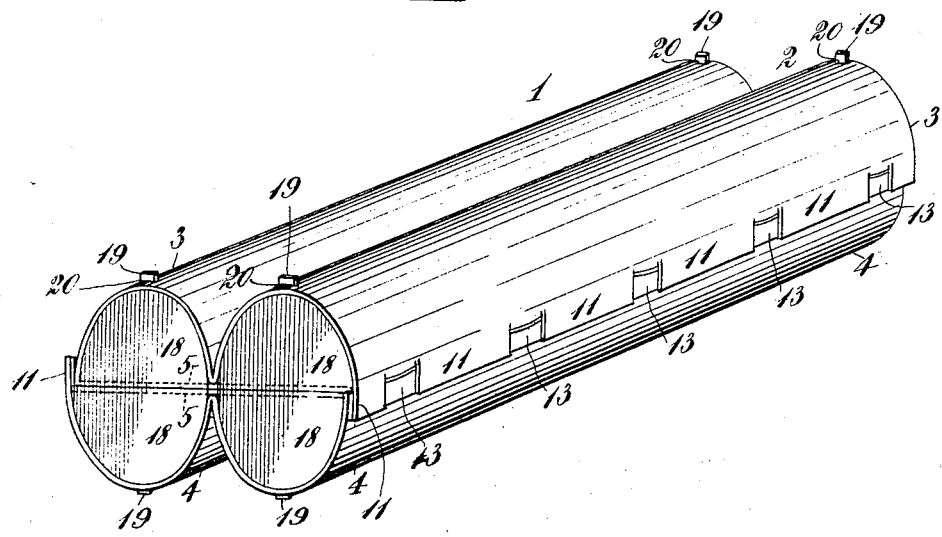
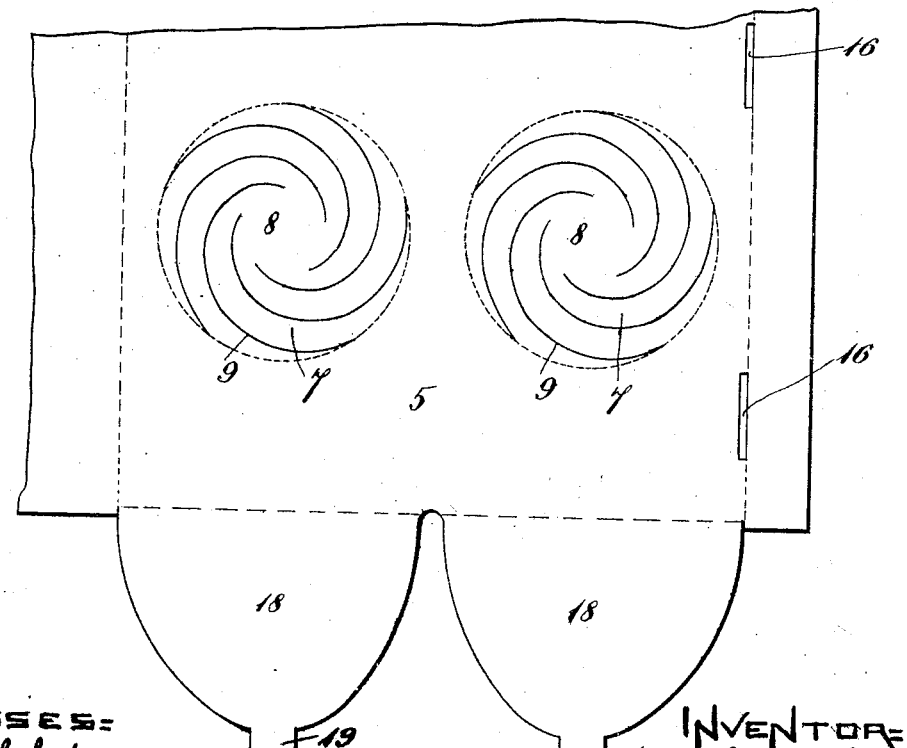
WITNESSES:
M. E. Flaherty
Q. E. O'Brien
INVENTOR:
James S. Lang
By
Coale & Hayes
his attorneys J. S. LANG.
EGG CASE.
APPLICATION FILED AUG. 10, 1914.
1,205,362.
Patented Nov. 21, 1916.
2 SHEETS—SHEET 2.
Fig-4-
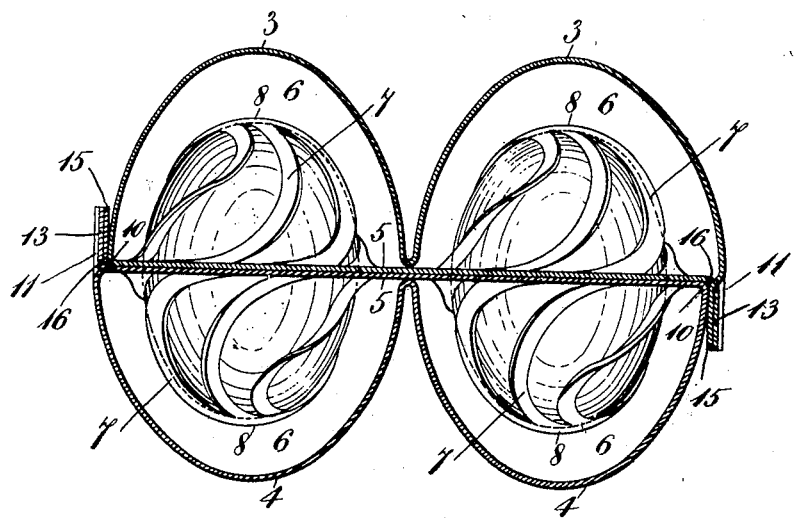
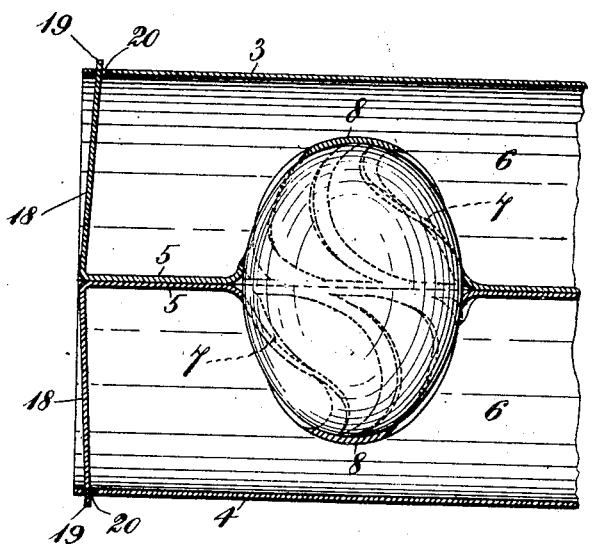
Fig-5-

UNITED STATES PATENT OFFICE.

JAMES S. LANG, OF BOSTON, MASSACHUSETTS.

EGG-CASE.

1,205,362.

Specification of Letters Patent.

Patented Nov. 21, 1916.

Application filed August 10, 1914. Serial No. 855,999.

*To all whom it may concern:*

Be it known that I, JAMES S. LANG, of Boston, in the county of Suffolk and State of Massachusetts, a citizen of the United States, have invented a new and useful Improvement in Egg-Cases, of which the following is a full, clear, and exact description, reference being had to the accompanying drawings, forming a part of this specification, in explaining its nature.

The present invention relates to a case or package for containing eggs and one which is essentially adapted for shipping the eggs by parcel post.

The essential object of the invention is to provide a case of the above character which may be formed from blank material or cardboard; to provide a case also forming a convenient package and within which the eggs properly inclosed are supported out of contact with the enveloping walls of the case so that they will not become easily broken by contact of the case with exterior objects during transit.

A case embodying my invention can best be seen by reference to the drawings, in which—

Figure 1 shows the case in perspective; Fig. 2 is a plan of a portion of the blank from which the case is made; Fig. 3 is a section taken on line 3—3 of Fig. 2; Fig. 4 is a cross section of the case, the interior parts being shown in side elevation; and Fig. 5 is a longitudinal vertical section of a portion of the case.

Referring to the drawings, the body of exterior wall of the case comprises the combined units or parts 1 and 2, respectively, each designed to contain a number of eggs and preferably one-half dozen eggs.

The parts or units 1 and 2 each comprises or is made up of sectional halves 3 and 4, respectively, which when placed together or properly superposed upon one another, present an elongated receptacle of uniform substantially elliptical cross section throughout and furnishing an inclosure of sufficient size to loosely contain the eggs held therein in a vertical or upright position. In other words, the respective parts or units 1 and 2 each composed of the sections 3 and 4 as aforesaid are of such dimensions that the eggs held therein will not contact with the inclosing wall furnished by these parts but will be held as it were in suspension therein.

The parts or units 1 and 2 are made of cardboard or other suitable flexible material which may be readily bent into shape and which will retain its shape and which will not be easily indented or be distorted by contact with exterior objects. In this connection it is to be observed by reference to Fig. 4 that the combined sectional halves 3—3, 4—4 of the respective units 1 and 2 of the case are each made by rounding and otherwise bending in and out a single piece of sheet material or cardboard.

The eggs are supported within the respective combined parts or units 1 and 2 of the case by nesting or pocketing them in the following manner: Connecting with each sectional half of the case is a flat piece of material or cardboard 5 which extends across the interior side of the section and thereby provides a support for the eggs located adjacent the entrances to the semi elliptical chambers or cavities 6 formed within the section. When the respective sections are assembled properly superposed upon one another the respective egg supporting pieces 5 will lie parallel in contact with one another and cross or bisect the inclosure formed by the respective units 1 and 2 in the manner of partitions.

The eggs are carried by the pieces 5 by incising them to provide openings through which the eggs may extend to about the center of each egg. The half portions of the eggs thus extending through the openings will then be within the chambers 6 and will be held therein in positions out of contact with the walls of these chambers by arms or ribs 7 secured to the pieces 5 around the openings therein. These arms 7 extend over the eggs enveloping the same and connect with pieces 8 which bear against the ends of the eggs. It is evident that when both half sections of the case are assembled that eggs contained within the same are supported by the combined pieces 5 and the respective sets of arms 7 and pieces 8 attached thereto which completely envelop the egg and provide as it were cages for holding the eggs out of contact with the outer enveloping walls 3 and 4 of the respective sections.

I have found that the arms 7 and end bearing pieces 8 may be struck from the pieces 5 of sheet material or cardboard simply by incising these sheets with a plurality of spiral cuts annularly arranged substantially as shown in Fig. 2, the arms 7 being formed from the material between the cuts and the end pieces 8 from the material at the center around which the cuts are made. After the incision of the piece or blank in this manner the cut part will readily give or separate as the egg is inserted, to inclose the egg and form the retaining arms and end pieces as aforesaid. Thus formed the pockets provide not only supports for the eggs but also elastic supports, the tendency of the parts being to tightly hug the eggs and return to their normal positions as shown in Fig. 2.

The interior pieces 5 which support the eggs are formed and connect with the respective sections of the case with which they are coöperating by bending the sheet material or cardboard from which each of the exterior combined parts 3—3, 4—4 is formed, to extend from a point 10 of the sheet at one side of the case where the bend is made to the fore end 11 of the sheet on the other side of the case where the sheet thus extended is bent abruptly at the point 12 to form a turned edge or flange 13 to which the fore end 11 of the sheet is attached. Such attachment is secured by incising the fore end 11 of the sheet to form clips 15. With the exception of the parts incised to form these clips the fore end 11 of the sheet bears against the face of the turned edge 13 thereof while the clips 15 pass through slots 16 formed in the sheet at the bend 12 therein to lie back of the edge 13 and bear against the same, the parts thus forming an interlocking connection. Such connection assists not only in the retention of the pieces 5 but tends also to maintain the entire form of the combined half sections 3 and 4 from which the case is made so that these sections can easily be assembled to form the complete case. The turned ends 13 of the sheets and fore ends 11 thereof bearing against the same as aforesaid assist also as guards in defining the proper assembled position of the respective half sections of the case and prevent lateral displacement thereof inasmuch as these combined ends to one section of the case provide a lateral bearing for the other section thereof (see Fig. 4). The parts thus far described form a complete case upon the assembling of the respective sections thereof which are held together by tying the same in the manner of an ordinary package. I prefer however to provide a closure for the ends of the case and which assists also in maintaining the form of the case. For these purposes I have provided end pieces or flaps 18 of semi elliptical form and which fill the space at the ends of the case between the egg supporting pieces 5 and the adjacent enveloping walls 3 and 4 of the respective sections. The flaps 18 are attached to the respective pieces 5 preferably by integral connection therewith and are otherwise retained in an engaging position closing the ends of the case by clips 19 on the outer ends thereof which extend through slots 20 cut in the outer enveloping walls of the respective sections with which the flaps are coöperating as aforesaid. Thus formed and arranged the flaps not only close the ends of the case but also by their bearing against the outer walls of the case at the ends thereof operate as braces for reinforcing these walls.

Having thus fully described my invention, I claim and desire to secure by Letters Patent of the United States:

1. An egg case of cardboard or other flexible material comprising an outer enveloping wall, interior egg-supporting pieces parallelly arranged adjacent one another, each of said pieces having therein spiral cuts annularly arranged to form egg-receiving pockets, said pockets having outwardly-yielding arms and center pieces carried by said arms, said arms and center pieces engaging respectively the sides and ends of the eggs deposited within said pockets.

2. In an egg case, an egg-supporting piece of cardboard or other suitable material having in it a series of spiral cuts annularly arranged to form an egg-receiving pocket for one-half of an egg, said pocket having outwardly-yielding arms and a center piece carried by said arms, and which arms and center piece bear respectively against the sides and end of that portion of the egg contained within said pocket.

3. An egg case of cardboard or other flexible material comprising an outer enveloping wall made up of separate superposed sections, interior egg supporting pieces carried by said respective sections, the same having spirally curved cuts therein to form openings in said pieces with curved arms extending from said pieces to embrace the sides of the eggs and pieces carried by said arms bearing against the ends of the eggs for pocketing the same and holding them out of contact with the outer enveloping wall.

4. In an egg case, associated flat pieces of cardboard or other flexible material each having openings in them oppositely arranged in said respective pieces with arms extending from around said openings to embrace the sides of eggs contained therein, and other pieces with which said arms connect and which are held thereby to bear against the ends of the eggs.

5. In an egg case, associated flat pieces of cardboard or other flexible material, each having curved cuts in them annularly arranged to provide separate yielding arms of material between the sides of said cuts, and a common piece of material centrally disposed between the ends of the cuts and with which said arms connect, substantially as described.

6. In an egg case, associated flat pieces of cardboard or other flexible material having spirally curved cuts therein annularly arranged with portions of material left between sides and inner ends of said cuts to form yielding arms and end pieces bearing respectively against the sides and ends of said eggs for embracing and holding the same, substantially as described.

7. An egg case comprising superposed sections of cardboard or other flexible material, each consisting of a single sheet of material bent to form a curved outer envelop from one end of which the sheet is bent to form an interior egg supporting piece extending to the fore end of said sheet, then bent to form a flange connecting with said fore end of the sheet and providing a lateral bearing for said other section, substantially as described.

8. An egg case comprising separate superposed sections of cardboard or other flexible material, each consisting of a single sheet of material bent to form a curved outer envelop from one end of which the sheet is bent to form an interior egg supporting piece extending to the fore end of said sheet, said piece having foldable flaps laterally extending therefrom and filling the space at the ends of the case between each of said pieces and said outer envelop.

9. An egg case comprising separate superposed sections of cardboard or other flexible material each consisting of a single sheet of material bent to form a curved outer envelop with slots therein at the ends thereof and from one end of which the sheet is bent to form an interior egg supporting piece extending to the fore end of said sheet, said piece having foldable flaps laterally extending therefrom with clips on the ends of said flaps, said flaps extending from said pieces to close the space between the same and said envelop at the ends of the case and said clips extending through the slots formed in said envelop.

10. In a packing-receptacle, a blank having a cushion-member formed integral therewith and with its center directly connected to the rest of the blank by integral tongues produced by curved slits.

JAMES S. LANG.

Witnesses:
JOHN E. R. HAYES,
M. E. FLAHERTY.